United States Patent Office 2,881,051
Patented Apr. 7, 1959

2,881,051
PROCESS FOR FORMING A STABLE AGGLOMERATED MASS OF ACTIVE ALUMINA

Lucien Pingard, Salindres, France, assignor to Pechiney Compagnie de Produits Chimiques et Electrometallurgiques, Paris, France, a corporation of France No Drawing. Application March 19, 1954
Serial No. 417,513

Claims priority, application France March 25, 1953

6 Claims. (Cl. 23—143)

This invention relates to active alumina in the form of a stable agglomerated mass and to its preparation.

It is known that activated materials, such as activated silica, various activated forms of argillaceous earths, such as certain bentonites, montmorillonite, wollastonite, etc., activated alumina, and the like, at times may be advantageously used in aggregated or agglomerated masses. Such agglomerated masses may be formed in various ways, such as by tumbling, agitating, pressing, extruding, and the like, and may be advantageously used in various aggregated forms, such as granules, pellets, pills, tablets, or the like. It is also known that in the formation of such aggregated masses, various other ingredients or chemical compounds, such as catalytic materials, may be incorporated or suspended therein.

It is an object of this invention to provide an improved active alumina in the form of a stable agglomerated mass.

It is another object of this invention to produce aggregated or agglomerated masses of active alumina which have exceptional mechanical strength.

It is a further object of this invention to produce mechanically strong agglomerated masses of active alumina which have unexpectedly large microporous volume per unit of mass.

Other objects and features of the invention will be apparent from the more detailed description which follows.

Broadly conceived, this invention may be considered to involve a process whereby a stable and improved activated alumina is obtained in the form of an aggregated mass from an active finely divided alumina which contains a substantial amount, and advantageously a major amount, hydratable into bayerite, i.e. beta alumina trihydrate. More particularly, the invention may be considered to involve producing such improved agglomerated masses of active alumina from readily available raw materials, such as commercially available alumina trihydrates typified by bayerite, i.e. beta alumina trihydrate and hydrargillit, i.e. alpha alumina trihydrate. Thus, the process of this invention may be considered, in its more specific embodiments, to involve the following steps:

(1) Dehydrating and activating a trihydrate of alumina by heating at a temperature between about 150 and 500° C. under conditions such that the water vapor liberated from the area around the particles during the heating is removed substantially immediately after its formation until a substantial proportion of the alumina trihydrate, and advantageously a major portion thereof, is dehydrated into an alumina hydratable into bayerite, i.e. beta alumina trihydrate.

(2) Grinding the dehydrated and activated product, where necessary, to obtain the most desirable particle or granule size for the intended manner of agglomeration.

(3) Mixing the finely divided particles with water and forming them into agglomerates or aggregates of the type hereinbefore described by any of the means there described.

(4) Hydraulically hardening or fixing the agglomerates wherein water is chemically bound or chemically fixed as water of hydration or crystallization.

(5) Subjecting the hardened or fixed agglomerates to heat treatment to activate or reactivate the agglomerates at a temperature and for a period of time depending upon the intended use of the agglomerates.

In the practice of this invention, it has been discovered that a certain period of time is necessary for the formed agglomerates to be hydraulically fixed. This discovery is based upon the observation that the agglomerated mass exhibits substantially no mechanical strength and may be reduced to its initial structure if it is heated to activation or reactivation temperatures substantially immediately after its agglomeration. It has also been discovered that the hardening or fixing of the agglomerates is due to the fact that the alumina used in the process of this invention contains a substantial or a major portion of active alumina convertible into bayerite, i.e. beta alumina trihydrate and that this material must be permitted to be transformed at least partially into bayerite, i.e. beta alumina trihydrate by combination with water if a stable agglomerated or aggregated mass is to be obtained. The mechanical strength of the aggregated mass is related both to the amount of alumina which is convertible into bayerite, i.e. beta alumina trihydrate and to the extent to which this alumina is converted into bayerite, i.e. beta alumina trihydrate.

In practicing the first step described above, the active alumina may be prepared by heating alumina trihydrate, advantageously particles of hydrargillit, i.e. alpha alumina trihydrate or bayerite, i.e. beta alumina trihydrate, to slow dehydration at relatively low temperatures of about 150 to 500° C. and preferably at temperatures between 260 and 300° C. while removing the water vapor formed during the heating treatment substantially immediately after its formation. The period of heating depends upon the temperature and is inversely proportional to the temperature and is sufficiently long to obtain the desired degree of dehydration and the desired amount of active alumina hydratable into bayerite, i.e. beta alumina trihydrate. Any degree of dehydration, if dehydrated under conditions which will remove or substantially completely remove the water developed during the heat treatment, improves the yield of active alumina hydratable into bayerite, i.e. beta alumina trihydrate and the quality of the resulting product. In industrial practice heating may be continued for one or several hours or for one or several days, depending upon the degree of dehydration desired. Typically, in order to obtain alumina the major portion of which is rehydratable into bayerite, i.e. beta alumina trihydrate, heating is continued for about 40 to 60 hours at temperatures below 200° C. and from about 1 to 60 hours at temperatures above 200° C.

It has been discovered that if during the dehydration of the aluminum trihydroxide water vapor remains in contact with alumina particles heated at temperatures above 150° C., the formation of boehmite, i.e. alpha alumina monohydrate is promoted. This boehmite, i.e. alpha alumina monohydrate is not active per se and the dehydration thereof gives an alumina which is very low or lacking in activity and is not well designed for producing an aggregated mass of active alumina having exceptional mechanical strength and other desirable properties. Thus, it has been found that the water vapor formed during the dehydration of the alumina trihydroxide should be removed at a sufficiently rapid rate to avoid any substantial formation of boehmite, i.e. alpha alumina monohydrate crystals, i.e. substantially as the water vapor forms. In accordance with one procedure, the water vapor may be removed at a sufficiently rapid rate to avoid the substantial formation of boehmite, i.e. alpha alumina monohydrate crystals and to provide active alumina hydratable into bayerite, i.e. beta alumina trihydrate, i.e. substantially immediately after the water vapor's formation, by heating the aluminum trihydroxide under a high vacuum. In accordance with another practice, the water vapor as it forms during the heating process may be removed by forcing a heated fluid through a bed of aluminum trihydroxide, such as by forcing a hot dry gas stream upwardly through a bed of the alumina trihydrate maintained in teeter balance by the upwardly flowing gas, customarily designated as a fluo-solids technique.

The particle size of the alumina trihydrate used in the process of this invention has a considerable influence upon the yield of alumina which is rehydratable into bayerite, i.e. beta alumina trihydrate. Thus, alumina trihydrates of small particle size are preferably used in the process of this invention. It is probable that during the heating of the alumina trihydrate it is transformed into so-called transition alumina on the periphery of the particle and within an extremely thin layer thereof. As the inner part of the crystal is in turn dehydrated, the water vapor enclosed within the lattice of the alumina cannot escape rapidly and therefore remains in contact with the already formed transition alumina for a sufficient length of time to transform it at least partly into an inactive boehmite, i.e. alpha alumina monohydrate.

Thus, in order to reach a very high yield of active alumina capable of rehydration into bayerite, i.e. beta alumina trihydrate, it is necessary to use very fine alumina trihydrate as a starting material. It is known that the sizes of hydrargillit, i.e. alpha alumina trihydrate particles as obtained in Bayer's process are of the order of 30 to 90 microns. Although such particles can be converted into an active alumina having a predominant part which can be converted into bayerite, i.e. beta alumina trihydrate, the particles are too large for conversion into the active alumina which is substantially free from boehmite, i.e. alpha alumina monohydrate, even though the dehydration takes place under a vacuum or in a fluidized bed. Therefore, in accordance with a particular embodiment of this invention, a very fine hydrargillit, i.e. alpha alumina trihydrate is provided for the use in the process hereof by decomposing an industrial solution of sodium aluminate, say at a temperature of about 30° C., in the presence of a small amount of alumina gel acting as a seeding medium. Under such circumstances, lamellar mono-crystals are formed having their largest dimensions less than one micron and a thickness of the order of 1/50 of a micron. When these crystals are subjected to dehydration under the conditions set forth herein, badly organized (imperfectly crystallized) alumina are obtained wholly without or substantially without any boehmite, i.e. alpha alumina monohydrate in admixture therewith. The product thus obtained contains a very large percentage of alumina in a form which is rehydratable into bayerite, i.e. beta alumina trihydrate, which may exceed 90% when treated with water at ambient or room temperatures for a sufficiently long period of time.

Likewise, if the raw material used in the process of this invention is bayerite, i.e. beta alumina trihydrate, the dehydration is substantially easier than it is when using hydrargillit, i.e. alpha alumina trihydrate and the yield of the activated alumina of the desired type is much higher and may approximate the yield obtained from the specially prepared mono-crystals. The active alumina obtained from bayerite, i.e. beta alumina trihydrate is readily obtainable in a percentage wherein about 85% is rehydratable into bayerite, i.e. beta alumina trihydrate. It should be understood, however, that active alumina can be obtained from aluminum trihydrate in the form of Bayer's hydrargillit which contains a major or predominant part which is rehydratable into bayerite, i.e. beta alumina trihydrate. A yield of the order of 75% of such materials may be obtained from such alumina trihydrates.

The X-ray diffraction pattern of the alumina preferably produced in accordance with the first step described hereinbefore shows that they are free or substantially free of boehmite, i.e. alpha alumina monohydrate and that the alumina is very imperfectly organized but not completely amorphous. Likewise, the water content of the product is not constant and the composition may have a water content varying from $Al_2O_3 \cdot 0.7H_2O$ to $Al_2O_3 \cdot 0.07H_2O$ without any sharp changes in the properties of the alumina.

The active alumina produced in accordance with the first step described hereinbefore is characterized by a number of distinguishing characteristics, such as the following:

(1) A particular and characteristic X-ray diffraction pattern showing that the products are "very badly organized," or imperfectly crystallized, but are not completely amorphous or completely unorganized. The X-ray diffraction pattern also demonstrates that the alumina of this invention differ from the prior known transition alumina.

(2) An unusually high capacity to be hydrated or rehydrated to form bayerite, i.e. beta alumina trihydrate at ordinary temperatures by immersion in pure or untreated water, for example tap water. Typically, a major proportion of the alumina of this invention is hydratable into bayerite, i.e. beta alumina trihydrate and in accordance with a preferred embodiment of the invention from about 75 to 93% of the alumina is rehydratable into bayerite, i.e. beta alumina trihydrate. Special alumina are provided having 85% and more hydratable into bayerite, i.e. beta alumina trihydrate.

(3) A particularly low refractive index which is characteristically of the order of 1.51 to 1.54.

(4) A capacity to chemically bind or adsorb moisture, particularly at low partial water vapor pressures.

These activated alumina particles are also characterized by their very large surface area and their capacity to absorb large volumes of vapors.

These finely divided discrete alumina particles used to form the agglomerated or aggregated masses of this invention differ from previously known alumina, among other characteristics, in their high percentage of alumina hydratable or rehydratable into bayerite, i.e. beta alumina trihydrate. For example, as stated, the major proportions of the finely divided alumina produced in accordance with the procedure described hereinbefore can be hydrated into bayerite, i.e. beta alumina trihydrate while the prior known alumina contain only a small or a minor proportion of alumina which can be converted into bayerite, i.e. beta alumina trihydrate, even when left in contact with untreated or tap water at ordinary temperatures for a considerable period of time.

The finely divided alumina particles initially produced from the alumina trihydrate also differ from prior art so-called transition alumina in the respective phases through which they pass when they are subjected to heat treatment. For instance, the finely divided alumina particles initially produced as described hereinbefore, when subjected to heat treatment within the range of 400 to 1000° C., pass through successive phases as the temperature is increased, which are entirely different from the phases through which the so-called transition alumina particles pass.

After the formation of the agglomerated mass, the hydraulic fixing or hardening thereof by recrystallization of the active alumina into bayerite, i.e. beta alumna trihydrate is rather slow and takes several days or more to reach completion at ordinary or room temperatures, say temperatures of the order of 20° C. The rate of fixing or hydraulic hardening may be hastened by using elevated temperatures up to about 150° C. During this hardening or fixing, only a small proportion of the water mixed with the finely divided particles to form the aggregate is chemically combined in the rehydration. As a result, after the hardening has been completed, the major part of the water may be removed at moderate temperatures during the reactivation of the formed mass, say at temperatures of the order of 100° C. If it is desired or necessary to remove the last portion of the water, higher temperatures are required, say of the order of those used in the formation of the fine alumina particles, or even higher temperatures, say temperatures of 400 to 600° C., although for many purposes agglomerated masses of adequate mechanical strength can be obtained by heating at dehydrating and activating temperatures of about 250 to 400° C. During the removal of the last portion of water, a process which is the inverse of hydration takes place, i.e. the crystals of bayerite, i.e. beta alumina trihydrate are dehydrated and formed into very poorly organized (imperfectly recrystallized) active alumina having exceptional properties of reactivity, such as an exceptional capacity to adsorb water vapor when the partial pressures thereof are very low. Yet, these agglomerates, even after having their chemically combined water of crystallization removed, preserve the cohesion that has been imparted to them by the hydration. Under such dehydrated condition the agglomerated mass shows remarkable mechanical strength and the aggregates can undergo heat treatments at very high temperatures, even substantially above the dehydration temperatures, without their strength being destroyed or substantially lost.

As stated earlier, the degree of hydraulic fixing or rehydration which has taken place in the aggregated mass when it is subjected to reactivation temperatures has a marked influence upon the mechanical strength of the formed agglomerate mass. Basically, there are two ways in which the hydraulic fixing may take place: (1) an extended period of hydraulic fixation at normal or room temperatures, or (2) a shorter period of hydraulic fixation at elevated temperatures. If hydraulic fixing is to take place at ordinary temperatures and under atmospheric conditions, the time consumed will be several days or more. On the other hand, the agglomerated mass may be fixed in a moist atmosphere by heating at a temperature of say 100° C. within a period of a few hours. Particularly satisfactory results are obtained by treating the mass of alumina aggregated into the desired structural form in a moist atmosphere at a temperature of about 100° C. for 8 to 10 hours. Such hydraulically fixed materials will develop a very large microporous volume if they are subsequently subjected to heating at reactivation temperatures, such, for example, as by flowing dry air over or through the formed mass at temperatures between 400 and 600° C. In fact, after the activation the aggregates show a relatively small surface area increase but a very important increased volume of pores. New regions of inter-particle adsorption appear, apparently resulting from granules welding together as a result of hydration.

If the aggregated mass is subjected to treatment in a closed container at a somewhat more moderate temperature, say 75° C. or below, rehydration is slower but the formed aggregates will develop a sufficient hardness for most purposes after heating for a like or somewhat extended period of time. Aggregates hydraulically fixed under these milder setting or hardening temperatures possess a somewhat lesser volume of pores per unit of mass than those hardened at the higher temperatures, but the volume of pores is still substantially larger than that possessed by the finely divided active alumina particles from which the aggregate is formed. The products obtained at these somewhat milder hardening or fixing temperatures do not differ markedly from the products obtained by hydraulic hardening at ordinary or room temperatures for several days or more.

The agglomerated masses or aggregates of this invention possess characteristics hereinbefore attributable to the discrete particles or granules from which they are formed, such as unusually low refractive indices; poorly organized or imperfectly crystallized but not wholly amorphous structure; capacity to be hydrated into bayerite, i.e. beta alumina trihydrate; exceptional binding or adsorptive capacity for water especially at low partial water vapor pressures, etc.; but also possess the advantage of somewhat increased surface area and the marked advantage of greatly increased microporous volume. Additionally, as pointed out, the aggregates are structurally stable and may be produced so as to have exceptional mechanical strength and heat stability.

In the process of this invention, the specific surface area of the aggregated mass is also important and it generally exceeds that of the products subjected to agglomeration.

The following examples will further illustrate the invention but are not to be considered a limitation thereupon.

*Example 1*

A hot dry air stream is forced upwardly through a bed of commercial hydrargillit, i.e. alpha alumina trihydrate obtained in Bayer's process. The alumina particles are maintained in teeter balance and the water vapor is so removed as it forms during the heating.

The temperature of the air is about 350° C. and the percentage of water in the alumina after treatment is in the range from 8 to 12%.

The activated powdered alumina having a surface area of 240 m.²/g. and a volume of pores of 0.19 cm.³/g. was ground two hours in a ball-mill to a particle size adapted for the formation of a hydraulic cementitious material. The ground material was mixed with water and agglomerated into granular aggregates of 2 to 5 millimeters. The granular aggregates were fixed or hardened in open barrels for 8 days, then dried for 8 hours at 100° C., and then reactivated by heating for 2 hours at 300° C. with a stream of dry air. A product was obtained having the following composition:

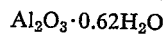

$$Al_2O_3 \cdot 0.62H_2O$$

with a surface area of 260 m.²/g. and a volume of pores of 0.29 cm.³/g.

*Example 2*

Granular aggregates were prepared in the same manner and under the same conditions described in the preceding example. The granular aggregates were hydraulically hardened by being maintained for 8 hours at 100° C. in a closed, but not hermetically closed, barrel. Thereafter the aggregates were dried at 100° C. and then subjected to reactivation for 2 hours at 400° C. The product obtained had the composition: $Al_2O_3 \cdot 0.36H_2O$ with a surface area of 200 m.²/g. and a volume of pores of 0.33 cm.³/g.

*Example 3*

The same procedure was followed as in Example 2 with the exception that reactivation was carried out at 560° C. The product obtained had the composition: $Al_2O_3 \cdot 0.16 H_2O$ with a surface area of 180 m./g. and a volume of pores of 0.36 cm.³/g.

The aggregated masses obtained in the preceding examples not only had a substantial increase in volumes of micropores but also possessed exceptional mechanical strength. They could be readily used under conditions normally encountered in the utilization of activated alumina without being disintegrated. Also, the activated alumina are derived from crystalline alumina trihydrate and contain no more alkaline impurities than the initial trihydrate, i. e., the aggregate is free of added alkaline compounds.

The microporous volume of the aggregates of the foregoing examples exceeded that obtained from the activation of the alumina trihydrate which produces the highest volume of micropores. For example, when Bayer's hydrargillit, i.e. alpha alumina trihydrate is activated directly at 560° C., a product is obtained which shows the greatest volume of pores obtainable from such a material by direct activation. Such a product has a surface area of 130 m.²/g. and a volume of pores of 0.29 cm.³/g.

While the foregoing discussion has emphasized the water adsorption or adsorption properties of the alumina of this invention, it will be understood that the alumina aggregates produced in accordance with this invention may be used advantageously in all types and kinds of chemical operations where such activated materials are used, whether used per se or in combination with other ingredients or chemicals. Typically, the products may be used for adsorption, drying of gas, chromatography, catalysis, as support catalysts, in the production of aluminum fluoride by dry processes, in the manufacture of refractory insulators, etc.

It should be understood that the present invention is not limited to the specific illustrative details set forth herein except where otherwise indicated and that it extends to all equivalents which will occur to those skilled in the art upon consideration of the scope of the claims appended hereto.

What is claimed is:

1. A process for forming a mechanically strong agglomerated mass of active alumina having a volume of micropores substantially greater than the alumina from which the agglomerate is produced, which comprises heating finely divided particles of a crystalline alumina trihydrate not exceeding 90 microns in size at temperatures of about 150° C. to 500° C. while removing the water vapor liberated, from the area around the particles being heated, substantially immediately after its formation until a major proportion of the alumina trihydrate is dehydrated into an alumina hydratable into crystalline beta alumina trihydrate, grinding the active material to reduce the particle size so that they are predominantly below 1 micron in size, mixing water with the dehydrated material and forming the mixture into an agglomerated mass, hydraulically hardening the formed mass in a moist atmosphere at a temperature of the order of about 100° C. for a period of time of about 8 to 10 hours, and heating the hardened material with a stream of dry air at a temperature above 250° C. to activate the formed material, thereby producing an agglomerate having a volume of micropores substantially greater than the alumina from which the agglomerate is produced.

2. The process of claim 1 when the activation takes place at a temperature of about 400 to about 600° C.

3. A process for forming a stable agglomerated mass of active alumina having a volume of micropores substantially greater than the alumina from which the agglomerate is produced, which comprises heating finely divided particles of an alpha alumina trihydrate not exceeding 90 microns in size at a temperature of about 150 to 500° C. while removing the water vapor liberated, from the area around the particles being heated, substantially immediately after its formation until the proportion of water in the alumina is reduced to about 1.2 and 12% by weight, mixing water with the dehydrated material and forming the mixture into granules, hydraulically hardening the formed granules at a temperature of about 20 to 150° C. by at least partially rehydrating the dehydrated alumina, and heating the hardened granules at a temperature above 250° C. to dry the material and to activate the alumina by partially dehydrating the hardened alumina granules, thereby producing an agglomerate having a volume of micropores substantially greater than the alumina from which the agglomerate is produced.

4. A process for forming a stable agglomerated mass of active alumina having a volume of micropores substantially greater than the alumina from which the agglomerate is produced, which comprises heating a bed of finely divided particles of alpha alumina trihydrate not exceeding 90 microns in size at a temperature of about 150 to 500° C. while expelling the water vapor liberated, from the area around the particles being heated, substantially immediately after its formation until the proportion of water in the alumina is reduced to about 1.2 to 12% by weight, mixing water with the dehydrated material and forming the mixture into agglomerated granules, maintaining the agglomerated granules at a temperature of about 20 to 150° C. until the dehydrated alumina is hardened by being at least partially converted into beta alumina trihydrate, and heating the hardened agglomerated granules at a temperature of about 250 to 600° C. to dry the material and to activate the alumina by partially dehydrating the hardened agglomerated alumina granules, thereby producing an agglomerate having a volume of micropores substantially greater than the alumina from which the agglomerate is produced.

5. A process for forming a stable agglomerated mass of active alumina having a volume of micropores substantially greater than the alumina from which the agglomerate is produced, which comprises heating a bed of finely divided particles of alpha alumina trihydrate containing particles of about 30 to 90 microns in size maintained at a temperature between 150 and 500° C. by an upwardly flowing stream of hot air until the proportion of water in said alumina is reduced to about 1.2 to 12% by weight, grinding the dehydrated material until the particles thereof are predominantly below 1 micron in size, mixing water with the dehydrated material and forming the mixture into agglomerated granular aggregates, maintaining the agglomerated aggregates at a temperature of about 20 to 150° C. until the dehydrated alumina is hardened by being at least partially converted into beta alumina trihydrate, and heating the hardened agglomerated aggregates at a temperature above 250° C. to dry the material and to activate the alumina by partially dehydrating the hardened agglomerated alumina aggregates, thereby producing agglomerated aggregates having a volume of micropores substantially greater than the dehydrated alumina from which the agglomerates are produced.

6. A process for forming a stable agglomerated mass of active alumina having a volume of micropores substantially greater than the alumina from which the agglomerate is produced, which comprises heating a bed of finely divided particles of alpha alumina trihydrate containing particles of about 30 to 90 microns in size maintained at a temperature between 150 and 500° C. by an upwardly flowing stream of hot air until the proportion of water in said alumina is reduced to about 1.2 to 12% by weight, grinding the dehydrated material until the particles thereof are of a size suitable for agglomerization, mixing water with the dehydrated material and forming the mixture into agglomerated granular aggregates, maintaining the agglomerated aggregates at a temperature of about 20 to 150° C. until the dehydrated alumina is hardened by being at least partially converted into beta alumina trihydrate, and heating the hardened agglomerated aggregates at a temperature above 250° C. to dry the material and to activate the alumina by partially dehydrating the hardened agglomerated alumina aggregates, thereby producing agglomerated aggregates having a volume of micropores substantially greater than the dehydrated alumina from which the agglomerates are produced.

References Cited in the file of this patent

UNITED STATES PATENTS

| | | |
|---|---|---|
| 1,540,446 | Wilson | June 2, 1925 |
| 1,953,201 | Tosterud | Apr. 3, 1934 |
| 2,247,624 | Wall | July 1, 1941 |
| 2,352,867 | Stowe | July 4, 1944 |
| 2,378,155 | Newsome | June 12, 1945 |
| 2,406,420 | Weiser et al. | Aug. 27, 1946 |
| 2,478,675 | Tamele | Aug. 9, 1949 |
| 2,549,549 | Wall | Apr. 17, 1951 |
| 2,656,250 | Thibon et al. | Nov. 20, 1953 |

FOREIGN PATENTS

| | | |
|---|---|---|
| 118,641 | Australia | July 6, 1944 |